United States Patent [19]

Meneses et al.

[11] Patent Number: 4,917,396
[45] Date of Patent: Apr. 17, 1990

[54] TRICYCLE

[76] Inventors: Sabino Meneses; Irene Meneses, both of 267 Congressional La., Rockville, Md. 20852

[21] Appl. No.: 327,241

[22] Filed: Mar. 22, 1989

[51] Int. Cl.⁴ ............................................. B62K 5/08
[52] U.S. Cl. .................................. 280/267; 280/282; 280/62; 224/30 A
[58] Field of Search ........................ 280/282, 267, 62; 224/36, 30 A

[56] References Cited

U.S. PATENT DOCUMENTS

| 1,540,271 | 6/1925 | Mayer | 280/267 X |
| 2,890,819 | 6/1959 | Glenny | 224/32 |
| 4,113,043 | 9/1978 | Palmer | 180/33 A |
| 4,176,771 | 12/1979 | Dubroc | 224/39 |
| 4,331,270 | 5/1982 | Humlong | 224/32 R |
| 4,387,836 | 6/1983 | Laesch | 224/32 A |
| 4,740,004 | 4/1988 | McMullen | 280/282 X |
| 4,863,185 | 9/1989 | Hwang et al. | 280/267 |

FOREIGN PATENT DOCUMENTS 456701 5/1949 Canada ................................. 224/36
6628 3/1901 United Kingdom ............... 280/267

Primary Examiner—Charles A. Marmor
Assistant Examiner—Alan Kagen
Attorney, Agent, or Firm—Jerry T. Kearns

[57] ABSTRACT

A tricycle includes a frame mounting a single large diameter rear wheel and a pair of small diameter front wheels. A pedal crank mechanism is connected through a chain and sprocket to drive the single rear wheel. The front wheels are mounted on front fork members disposed at opposite ends of a transverse steering bar. A perpendicular attached steering rod extends through a head tube on the tricycle frame and connects with a handle bar having an elongated central portion extending parallel with the transverse steering bar. A rectangular basket is disposed forwardly of the steering rod and includes a pair of spaced parallel vertically extending corner frame members secured between the central handle bar portion and the transverse steering bar. The tricycle provides a stable and efficient vehicle which may be utilized by individuals for shopping and exercise purposes.

1 Claim, 3 Drawing Sheets

TRICYCLE

BACKGROUND OF THE INVENTION

1. Field of the Invention

The present invention relates to tricycles, and more particularly pertains to a specially designed tricycle which provides a stable vehicle which includes a basket for transporting a relatively large amount of cargo. Many individuals shop for groceries and other items at large shopping centers which are fairly close to their homes. However, these individuals nonetheless drive their cars this short distance to the shopping center. This results in traffic jams, air pollution and unnecessary use of imported oil. Additionally, many individuals lead a sedentary lifestyle and do not take an adequate amount of exercise. In order to overcome these problems, the present invention provides a specially designed tricycle which includes a large basket for transporting a relatively large amount of cargo, such as groceries and other purchased items. The tricycle of the present invention may also be utilized as a delivery vehicle, for example by newspaper carriers.

2. Description of the Prior Art

Various types of tricycles are known in the prior art. A typical example of such a tricycle is to be found in U.S. Pat. No. 2,890,819, which issued to C. Glenny on Jun. 16, 1959. This patent discloses a bicycle having equal diameter front and rear wheels and including a saddle bag basket system supported over the rear wheel. U.S. Pat. No. 4,113,043, which issued to J. Palmer on Sept. 12, 1978, discloses a tricycle having a large diameter front wheel and a pair of slightly smaller diameter rear wheels mounted at opposite ends of an elongated transverse axle. A rectangular basket is supported on a frame extending between the two rear wheels. The vehicle includes an electric motor for rotating the front wheel and a pedal crank mechanism for rotating the rear wheels. U.S. Pat. No. 4,176,771, which issued to T. Dubroc on Dec. 4, 1979, disclose a cargo platform attachment for a three wheeled motor vehicle which is secured in horizontal relation over the rear wheels. U.S. Pat. No. 4,331,270, which issued to R. Humlong on May 25, 1982, discloses a basket for a bicycle which includes a pair of frame members connected to the seat support tube and a second pair of frame members secured at opposite ends of the rear axle. The rectangular basket is supported behind the rider, over the single rear wheel. U.S. Pat. No. 4,387,836, which issued to D. Laesch on June 14, 1983, discloses a frame for securement adjacent the rear wheel of a bicycle for transporting a golf bag.

While the above mentioned devices are suited for their intended usage, none of these devices disclose a tricycle having a pair of small diameter front wheels and a large diameter rear wheel, with a large rectangular basket supported on a transverse steering arm and connected to a parallel portion of a handle bar. Inasmuch as the art is relatively crowded with respect to these various types of tricycles, it can be appreciated that there is a continuing need for and interest in improvements to such tricycles, and in this respect, the present invention addresses this need and interest.

SUMMARY OF THE INVENTION

In view of the foregoing disadvantages inherent in the known types of tricycles now present in the prior art, the present invention provides an improved tricycle. As such, the general purpose of the present invention, which will be described subsequently in greater detail, is to provide a new and improved tricycle which has all the advantages of the prior art tricycles and none of the disadvantages.

To attain this, a representative embodiment of the concepts of the present invention is illustrated in the drawings and makes use of a tricycle which includes a frame mounting a single large diameter rear wheel and a pair of small diameter front wheels. A pedal crank mechanism is connected through a chain and sprocket to drive the single rear wheel. The front wheels are mounted on front fork members disposed at opposite ends of a transverse steering bar. A perpendicularly attached steering rod extends through a head tube on the tricycle frame and connects with a handle bar having an elongated central portion extending parallel with the transverse steering bar. A rectangular basket is disposed forwardly of the steering rod and includes a pair of spaced parallel vertically extending corner frame members secured between the central handle bar portion and the transverse steering bar. The tricycle provides a stable and efficient vehicle which may be utilized by individuals for shopping and exercise purposes.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tricycle which has all the advantages of the prior art tricycles and none of the disadvantages.

It is another object of the present invention to provide a new and improved tricycle which may be easily and efficiently manufactured and marketed.

It is a further object of the present invention to provide a new and improved tricycle which is of a durable and reliable construction.

An even further object of the present invention is to provide a new and improved tricycle which is susceptible of a low cost of manufacture with regard to both materials and labor, and which accordingly is then susceptible of low prices of sale to the consuming public, thereby making such tricycles economically available to the buying public.

Still yet another object of the present invention is to provide a new and improved tricycle which provides in the apparatuses and methods of the prior art some of the advantages thereof, while simultaneously overcoming some of the disadvantages normally associated therewith.

Still another object of the present invention is to provide a new and improved tricycle which includes a pair of front small diameter wheels mounted on an elongated transverse steering arm and a large diameter rear wheel driven by a pedal crank mechanism.

Yet another object of the present invention is to provide a new and improved tricycle which includes a stably mounted large front mounted cargo basket for transporting groceries and other shopping items.

Even still another object of the present invention is to provide a new and improved tricycle which includes a pair of small diameter front wheels secured at opposite ends of a transverse steering arm and a large rectangular basket having corner frame members secured between the transverse steering arm and a central parallel handle bar portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
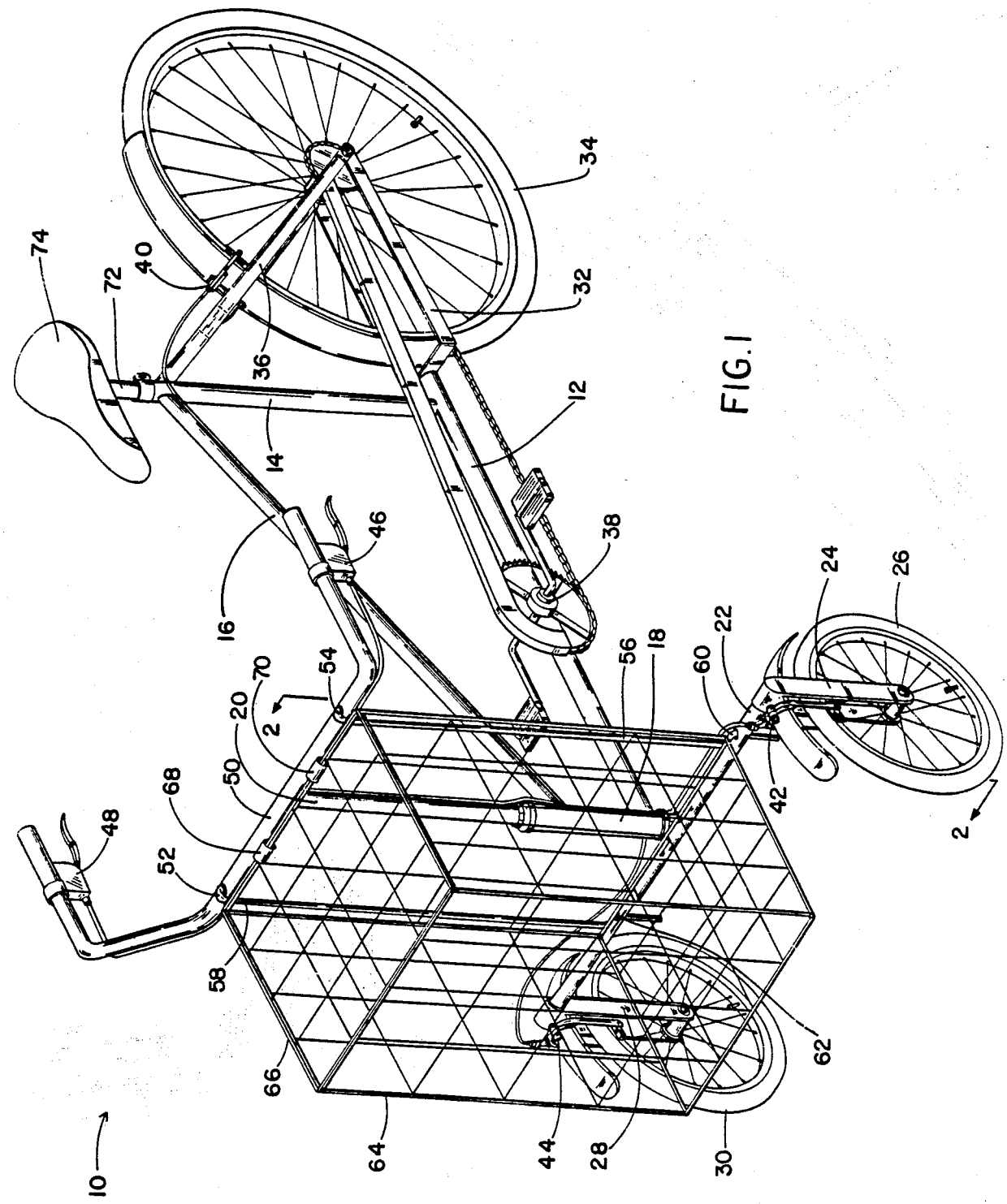
FIG. 1 is a perspective view of the tricycle according to the present invention.

With reference now to the drawings, and in particular to FIG. 1 thereof, a new and improved tricycle embodying the principles and concepts of the present invention and generally designated by the reference numeral 10 will be described.

More specifically, it will be noted that the first embodiment 10 of the invention includes an elongated tubular main frame member 12. A head tube 18 is perpendicularly attached at a front end of the main frame member 12 and a seat support member 14 is secured at an intermediate portion of the main frame member 12, and extends in spaced parallel relation with the head tube 18. A diagonal frame member 16 extends from a top portion of the seat support member 14 to a top portion of the head tube 18. A lower rear fork 32 is attached to a rear end of the main frame member 12 and extends parallel therewith. An upper rear fork 36 extends from an upper end of the seat support member 14 to a rear end portion of the lower rear fork 32. A large diameter rear wheel 34 is rotatably supported by conventional bearings by the upper 36 and lower 32 rear forks. A steering rod 20 is received for rotation within the head tube 18 and a transverse steering bar is perpendicularly secured at a lower end of the steering rod 20. A pair of front forks 24 and 28 are mounted at opposite ends of the transverse steering bar 22. A pair of small diameter wheels 26 and 30 are mounted for rotation by conventional bearings on the front forks 24 and 28. A handle bar 50 is secured at an upper end of the steering rod 20. The handle bar 50 includes a straight central portion extending in parallel relation with the transverse steering bar 22. A pedal crank mechanism 38 is mounted in a conventional fashion on the frame member 12 and is connected by a conventional chain and sprocket drive system operatively connected between the pedal crank mechanism 38 and the large diameter rear wheel 34. A generally rectangular basket 64 includes a lid 66 mounted by a pair of hinge members 68 and 70 for pivotal movement between open and closed positions. The basket 64 is preferably formed from a large diameter wire mesh material, but may alternatively be constructed from plastic. The basket 64 includes a pair of spaced parallel vertically extending rear corner frame members 56 and 58 which extend between the central portion of the handle bar 50 and through spaced vertical apertures 60 and 62 formed through the transverse steering bar 22. The corner frame members 56 and 58 include respective mounting stem portions 54 and 52 which extend through the handle bar 50. It should be noted that conventional gear change mechanisms may be provided on the pedal crank mechanism 38 without departing from the scope of the present invention. The tricycle includes a conventional rear caliper type brake 40 and a pair of front caliper brakes 42 and 44. Conventional brake actuating levers 46 and 48 are secured on the handle bar 50. The large diameter rear wheel 34 preferably has a diameter of twenty six or twenty seven inches and the small diameter front wheels 26 and 30 each preferably have a diameter of eight or ten inches. The front mounting arrangement of the basket 64 provides an exceptionally stable mounting, enabling a large amount of weight to be transported. Additionally, with the front mounting of the basket 64, a rider of the tricycle has a convenient view of the contents of the basket 64, and thus may conveniently ascertain the secure storage of the contents thereof.

Figure 2:
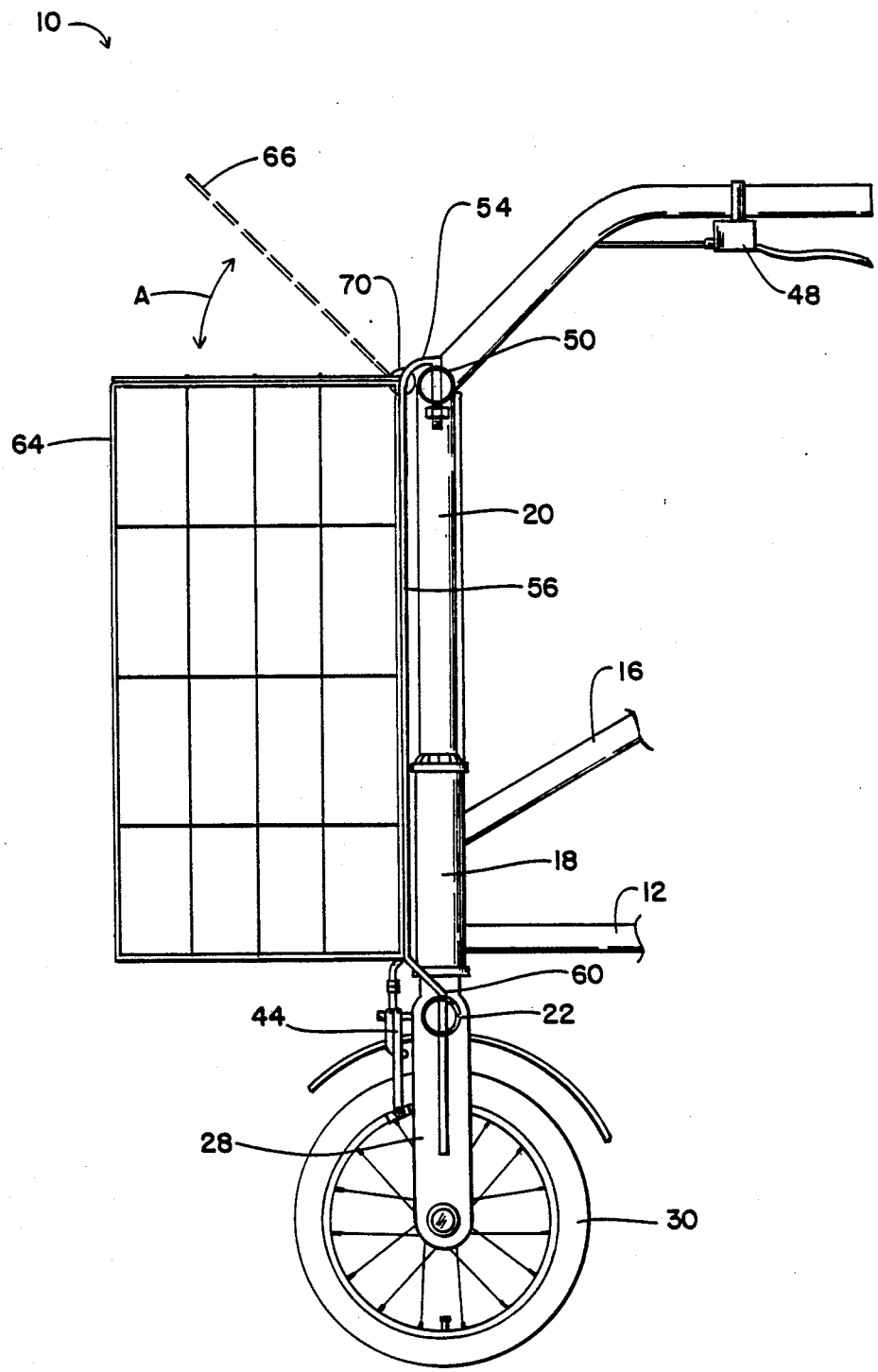
FIG. 2 is a cross sectional view, taken along line 2—2 of FIG. 1.

FIG. 2 illustrates a cross sectional view, taken along line 2—2 of FIG. 1 which illustrates the basket corner frame member 56 extending through the mounting vertical aperture 60 in the transverse steering bar 22. The upper mounting stem portion 54 of the corner frame member 56 extends vertically through an aperture provided at one end of the straight central portion of the handle bar 50. A suitable threaded fastener may be utilized to secure the mounting stem portion 54 in position. As may now be understood, the entire basket may be quickly attached or removed from the tricycle as desired. The pivotal lid 66 of the basket 64 is mounted for movement between open and closed positions as indicated by arrow A. A suitable locking mechanism may be provided for retaining the lid 66 in a closed position.

Figure 3:
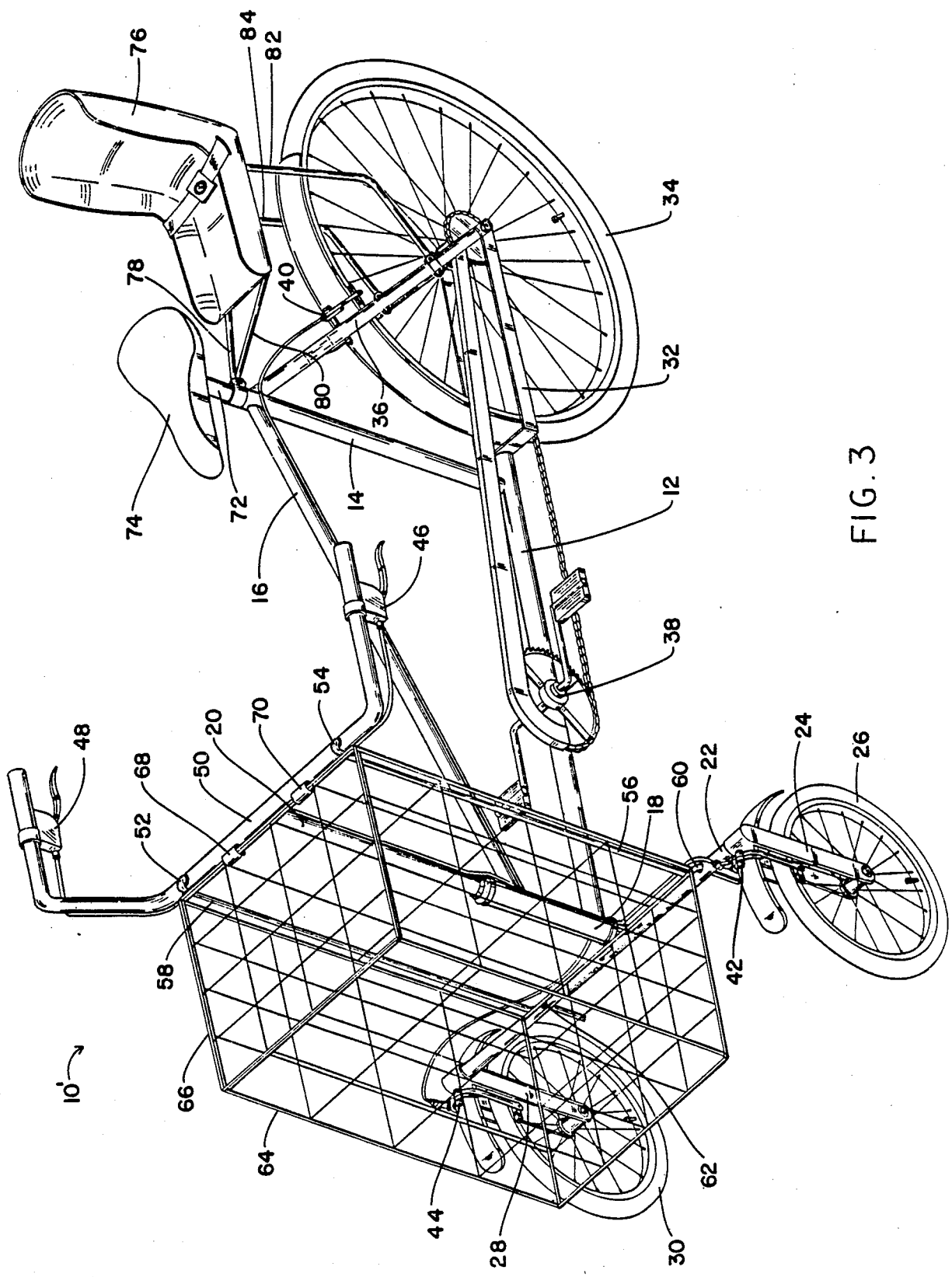
FIG. 3 is a perspective view illustrating the tricycle of the present invention, and including an optional rear mounted baby seat.

FIG. 3 illustrates the tricycle 10' according to a slightly modified version of the present invention in which an optional child carrier seat 76 is supported by a first pair of a frame members 82 and 84 secured to the upper rear fork 36 and a second pair of frame members 78 and 80 secured to an upper portion of the seat support member 14. The seat 74 is mounted on an adjustable stem 72 received within the seat support member 14 in a conventional fashion. The front mounting of the basket 64 thus enables a child carrier seat 76 to be utilized on the same vehicle. This arrangement is not possible on vehicles utilizing a large rear mounted basket.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tricycle, comprising:
    an elongated main frame member;
    a head tube perpendicularly attached at a front end of said main frame member;
    a seat support member secured at an intermediate portion of said main frame member, said seat support member extending in spaced parallel relation with said head tube;
    a diagonal frame member extending from a top portion of said seat support member to a top portion of said head tube;
    a lower rear fork attached to a rear end of said main frame member and extending parallel therewith;
    an upper rear fork extending from an upper rear end of said seat support member to a rear end portion of said lower rear fork;
    a large diameter rear wheel rotatably supported by said upper and lower rear forks;
    a steering rod received for rotation within said head tube;
    a transverse steering bar perpendicularly secured at a lower end of said steering rod;
    a pair of front forks secured at opposite ends of said transverse steering bar;
    a pair of small diameter wheels mounted for rotation by said front forks;
    a handle bar secured at an upper end of said steering rod, said handle bar having a central portion extending in parallel relation with said transverse steering bar;
    a pedal crank mechanism mounted for rotation on said main frame member:
    a chain and sprocket drive systematically connected between said pedal crank mechanism and said large diameter rear wheel; and
    a generally rectangular basket disposed forwardly of said steering rod, said basket having a pair of spaced parallel vertically extending corner frame members secured between said central handle bar portion and said transverse steering bar; said basket corner frame members each having a lower end received through said transverse steering bar.

* * * * *